INVENTORS
R. E. OPFERKUCH, JR.
B. R. THRASHER

BY *Roy H. Massengill*

ATTORNEY

United States Patent Office 3,448,180
Patented June 3, 1969

3,448,180
METHOD OF MAKING A FIBER OPTIC MOSAIC WITH OPTICAL SURFACES
Robert E. Opferkuch, Jr., and Bobby R. Thrasher, Decatur, Ala., assignors to Monsanto Company, St. Louis, Mo., a corporation of Delaware
Filed May 24, 1965, Ser. No. 457,952
Int. Cl. B29d *11/00;* G02b *5/16*
U.S. Cl. 264—1                                       1 Claim

ABSTRACT OF THE DISCLOSURE

A method for producing fiber optical mosaics for cathode tubes and the like includes the forming of a bundle of axially aligned fibers from a continuous filament and the holding of a portion of the fibers together while that portion is removed by a cutting operation from the bundle and while the ends of the fibers comprising the bundle are pressed against a polished heated surface to provide a mirror-smooth fused-end surface.

---

The present invention relates to fiber optical devices comprised of a multiplicity of filaments. More particularly, this invention relates to a method and apparatus for collecting and assembling continuous filaments in an ordered or aligned manner to facilitate severing the filaments into discs or short lengths which are bonded together by heating the faces thereof.

In the production of light-conducting fiber optical devices from a vast number of fine, elongated plastic filaments having light-conducting characteristics, the individual members must be accurately aligned within the bundle to transfer an image-forming light through the length of the bundle and accurately reproduce the image. Thus, the opposite ends of the fibers forming the bundle should have the same relative locations within the bundle so that image-forming light is transferred through the bundle length and accurately reproduced. The aligned fibers are then fused together to form a fiber optic device called a mosaic. By "mosaic" is meant a disc or bundle of aligned super-fine fibers having light-conducting properties and being cemented together by fused, polished faces.

The alignment and assemblement of the filaments employed for producing fiber mosaics presents a very tedious task because of the extremely small diameter of the filaments. For example, the fiber diameters may range down to about 0.003 inch and lengths of about 0.10 inch may be employed when manufacturing discs or face plates. If the fibers are from about 6 to 12 inches long there is a serious problem of maintaining the longitudinal position of the fibers with relation to each other within the bundle. Similarly, very short fibers are difficult to handle because of their tendency to become crossed within the compact group.

Heretofore, the light-conducting fibers generally have been made from materials such as glass or quartz, which do not provide filaments having the degree of flexibility as the amount that is possessed by the continuous plastic filaments contemplated to be processed in accordance with the present invention. Therefore, this invention is directed toward a method for overcoming the problems encountered when producing optical devices from continuous plastic filaments.

In accordance with the present invention there is provided a method for converting continuous plastic filaments having cross sections which are generally super fine into bundled fibers accurately aligned and having the ends thereof fused to produce a unitary body of fibers having polished faces at both ends of the bundle. The performance of the invention comprises the steps of advancing a continuous filament to a collection means, rotating the collection means to deposit the filament in an ordered manner on the collection means to form a circular bundle having essentially an elongated block form O-shaped configuration, holding the filaments in place in the collection means while discs having planer end surfaces are sliced from the bundle, removing the discs from a portion of the collection means, and subjecting the fiber ends of the disc to a heated surface to form a unitary fiber optical device having polished face surfaces. Normally the bundle of filaments has been cemented together by a potting resin or cement. These methods of cementing light-conducting fibers necessitate a subsequent polishing operation which require additional effort and expense.

Therefore, it is an object of the present invention to provide a method for rapidly and accurately producing optical devices consisting of a bundle of super-fine fibers servered from a collected mass of continuous filament and cemented together in a manner that imparts a polished surface to the ends thereof.

Another object of the present invention is to provide a method for collecting super-fine coninuous plasic filament in an ordered manner to form an O-shaped bundle of parallel arranged components and maintaining said arrangement while the components are severed and cemented together at both ends so as to produce mosaics having polished faces.

Another object of the invention is to provide means for collecting or amassing continuous plastic filaments, holding the filaments in place while the filaments are sliced into mosaics consisting of a multiplicity of parallel fibers, and cementing the fibers together and polishing the faces of the mosaics in a single operation.

Other objects and advantages will become apparent from the following detailed description when taken in conjunction with the drawings, in which.

Figure 1:
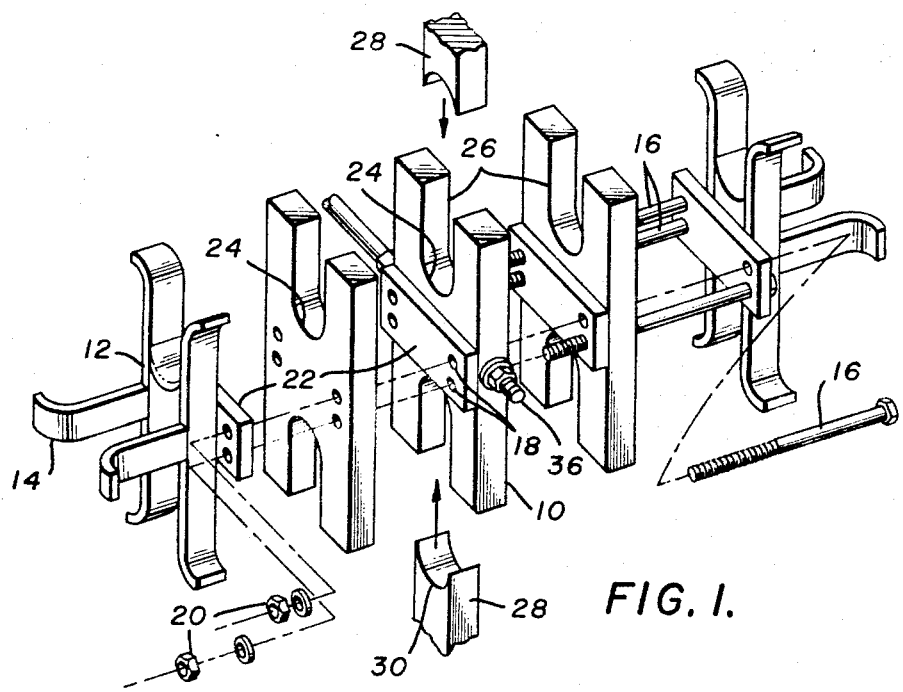
FIGURE 1 shows an exploded view of one embodiment of apparatus which may be employed for collecting and maintaining continuous filament in the ordered manner as contemplated by the present invention.
Figure 3:
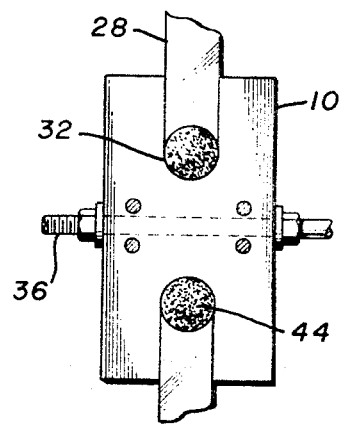
FIGURE 3 is a cross-sectional view of the apparatus shown in FIGURE 2 and taken through the section 3—3 which illustrates the circular bundle of filament collected thereon.

One embodiment of apparatus for carrying out the process of the invention is illustrated in FIGURE 1, wherein a group of three generally H-shaped members 10 and a pair of end members 12 having guide fingers 14 are retained together by a plural number of bolts 16 which extend through holes 18 in the members and are secured by screw nuts 20. There is a spacer bar 22 positioned between each of the members which separates the members 10 enough to accommodate a conventional cutting means, not shown. The H-shaped members have arcuated portions 24 extending outwardly beyond each edge of the spacer bars 22 which form oppositely disposed U-shaped notches 26. A rectangular bar 28 having an arcuated recess 30 in one end and a radius identical to the arcuated portion 24 is dimensioned to be inserted into a U-shaped notch 26 whereby a circular space 32 is formed between the two members, as shown in FIGURE 3. The surface of the rectangular bar are flush with those of the U-shaped plates to provide a smooth cutting surface.

Figure 2:
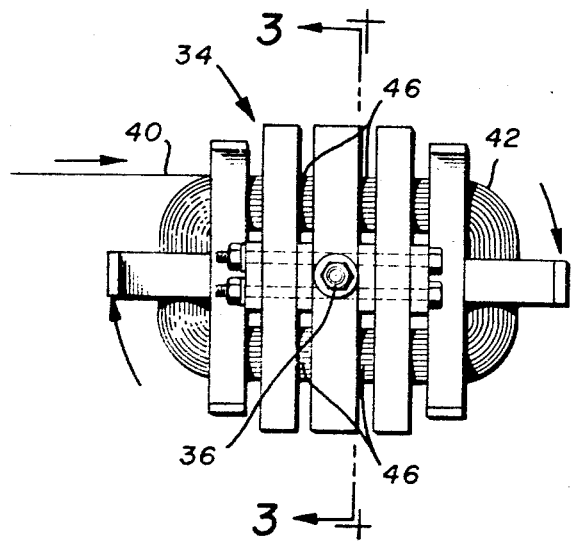
FIGURE 2 is an elevational view illustrating the apparatus of FIGURE 1 assembled and having a bundle of continuous plastic filament deposited thereon.

Referring to FIGURE 2, the apparatus is assembled as a unit 34 and supported on a rotatable shaft 36. A filament 40 is advanced from a supply package, not shown, and a predetermined amount is deposited in notches 26 while the unit 34 is rotated by a suitable means to form a yarn bundle 42. The rectangular bar 28 fits into each notch 26 to snuggly squeeze the bundle into a compacted circular mass 44 of parallel filament lengths and the bar is clamped in place. In the assembled bundle shown, the filaments exposed by the space 46 between members 10 are sliced along the surface edges of said members by conventional severing means to reduce the aligned filaments into a plurality of disc-like members corresponding to twice the number of H-shaped members stacked together. Consequently, the fiber lengths are determined by the thickness of the H-shaped members.

In accordance with the invention, any predetermined number of H-shaped plates 10 may be employed ranging from a single member to several and the thickness thereof will be selected to provide the length of fiber optical component desired. The spacer bars 22 have thicknesses sufficient to provide an adequate space between the H-shaped plates which hold the sliced fibers to accommodate a severing instrument of a well known type which is not a part of the invention except for its utilization in carrying out the process as contemplated by the invention.

Figure 4:
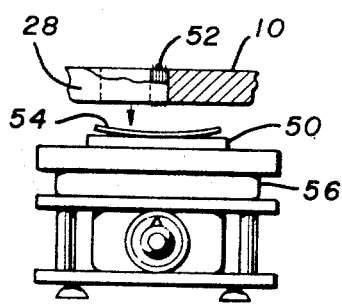
FIGURE 4 shows a heated steel plate and a release paper which are employed for the purpose of cementing and polishing the faces of mosaics consisting of fibers assembled and severed according to the present invention, and means for heating the steel plate.

Fiber optical devices having polished faces are produced in accordance with the invention by feeding a continuous filament to unit 34 which is rotated at a suitable speed to deposit a predetermined amount of filament thereon and the notched rectangular bar is inserted against the appropriate filament sections and clamped to hold them firmly in place while they are sliced into discs or short bundles. The unit is disassembled and the H-shaped plates are removed with the fiber sections compacted in circular space 32. Thereafter, the ends of the fiber sections are cemented and polished during a single step of subjecting the fiber ends to a sheet of aluminum foil or the like resting on a polished metal surface. To accomplish this in each instance a polished metal plate 50 as shown in FIGURE 4 is heated to the melting point of the filaments. The filaments 52 are then pressed down onto the heated plate where the ends are fused together and a nearly optically perfect surface is imparted to the fused ends. There must be employed a piece of aluminum foil 54 or a material having similar release properties between the plate and the filaments to act as a release paper. It has been found that the release paper prevents adhesion and imparts a nearly perfect optical surface to the fused ends. A standard hotplate 56 or any other suitable means may be used for heating the metal plate.

The fibers and clamping means may be removed from the assembled unit 34 and manipulated by hand to fuse the fiber ends. It has been found that the fiber ends extend beyond the surfaces of the clamping members far enough to facilitate a proper amount of fusion. This is important because if the fiber ends are fused to an excess the light-conducting properties thereof are deteriorated.

Figure 5:
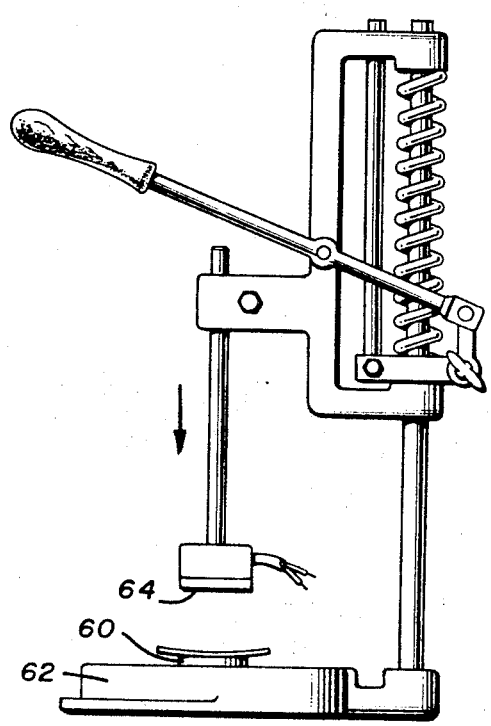
FIGURE 5 is an elevational view of another apparatus which may be employed for accomplishing the cementing and polishing operation on optical fiber discs as contemplated by this invention.

In FIGURE 5 there is shown a lever-press device for fusing the fiber ends wherein the fiber group 60 is placed upon a flat bedplate 62 and an electrically heated plate 64 having a polished surface is lowered into contact with the fiber ends. A release paper 66 is inserted between the polished surface and the fiber ends to insure against adhesion therebetween and also to aid in imparting a polished surface to the fiber ends.

Figure 6:
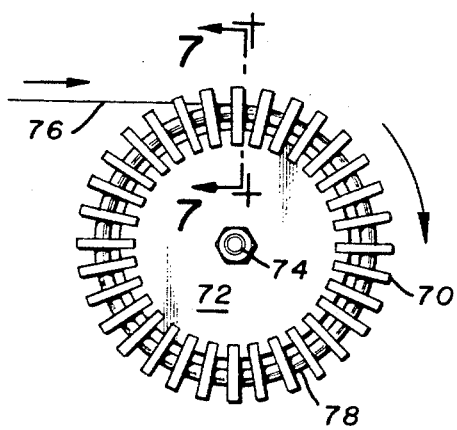
FIGURE 6 is a plan view of a circular arrangement of a multiple number of filament collecting members similar to those shown in FIGURE 2.
Figure 7:
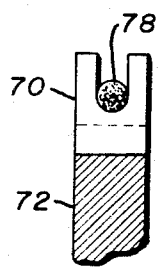
FIGURE 7 is a cross-section of FIGURE 6 taken at 7—7 to illustrate one end of a filament collecting member.

The unit 34 may be modified as shown in FIGURE 6 wherein a plural number of members 70 are positioned on a circular frame 72 which is mounted for rotation on shaft 74 to collect a continuous filament 76 and amass a bundle 78 of filaments on members as illustrated in FIGURE 7. Except for the minor changes neccessitated by the apparatus depicted in FIGURE 6, the process for clamping, cutting and cementing the filaments is the same as described previously.

Generally the H-shaped members or collection plates of this invention will have parallel surfaces so that all of the fibers severed will be the same length. It will be apparent however, that these members may be wedge shaped if desired whereby a fiber bundle or disc will be characterized by end surfaces which do not occupy parallel planes.

Although particular embodiments of apparatus of this invention have been described for illustrating the methods thereof, it is to be understood that the embodiments disclosed herein are merely illustrative and that these embodiments may be modified or amended and that numerous other embodiments may be contemplated without departing from the scope of the invention, except as limited by the appended claim.

We claim:
1. A method for producing fiber optical devices from continuous light-conducting plastic filaments comprising the steps:
  (a) winding a generally O-shaped bundle of aligned fibers from a continuous filament, said bundle being substantially circular in cross-section,
  (b) clamping selected portions of said bundle securely to retain said fiber axial alignment,
  (c) severing said bundle along planes adjacent said clamped portions to free said clamped portions from the body of said bundle to form longitudinal and axially aligned lengths of fibers having exposed ends,
  (d) removing said clamped portions from said bundle,
  (e) pressing the exposed ends of said clamped portions against a polished surface with a material having release properties capable of imparting optical surfaces employed therebetween, said polished surface heated at least to the melting point of the fiber to fuse the fibers together and to provide said clamped portions with a mirror-smooth optical surface to form a light-conducting mosaic having optical surfaces.

References Cited

UNITED STATES PATENTS

| | | | |
|---|---|---|---|
| 2,672,640 | 3/1954 | Peterson et al. | 264—243 |
| 2,979,632 | 4/1961 | MacNeille | 313—89 |
| 2,992,956 | 7/1961 | Bazinet | 264—1 |
| 3,119,678 | 1/1964 | Bazinet | 264—1 |
| 3,211,540 | 10/1965 | Cole | 65—4 |
| 3,355,273 | 11/1967 | Siegmund et al. | 65—4 |

JULIUS FROME, Primary Examiner.

A. H. KOECKERT, Assistant Examiner.

U.S. Cl. X.R.

264—243, 248; 350—96